US006547312B2

(12) United States Patent
Winkler

(10) Patent No.: US 6,547,312 B2
(45) Date of Patent: *Apr. 15, 2003

(54) METHOD AND APPARATUS FOR PROVIDING PERSONALIZING INFORMATION ON A GOLF CART

(75) Inventor: David R. Winkler, Pacific, MO (US)

(73) Assignee: Covered Solutions, Inc., Pacific, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/957,049

(22) Filed: Sep. 20, 2001

(65) Prior Publication Data
US 2002/0041106 A1 Apr. 11, 2002

Related U.S. Application Data

(63) Continuation-in-part of application No. 09/827,327, filed on Apr. 5, 2001, which is a continuation-in-part of application No. 09/634,437, filed on Aug. 8, 2000, now Pat. No. 6,220,647.

(51) Int. Cl.[7] .................................................. B60J 7/08
(52) U.S. Cl. ............. 296/100.14; 296/111; 280/DIG. 5; 135/88.01; 40/591
(58) Field of Search ..................... 296/11, 77.1, 100.14, 296/107.02, 97.21, 107.09, 78.1, 136, 118, 95.1; 280/DIG. 5, DIG. 6; 135/88.01, 88.02, 88.09; 150/159; 47/591, 611

(56) References Cited

U.S. PATENT DOCUMENTS

| 4,013,315 | A | * | 3/1977 | West .................. 280/DIG. 5 X |
| 4,098,536 | A | * | 7/1978 | Mills ................ 280/DIG. 5 X |
| 4,715,138 | A | * | 12/1987 | Cherico ........................ 40/591 |
| 4,773,175 | A | * | 9/1988 | Larsen ......................... 40/308 |
| 4,830,037 | A | * | 5/1989 | Held .................. 280/DIG. 5 X |
| 5,146,967 | A | * | 9/1992 | Chapman ..................... 150/159 |
| 5,190,340 | A | * | 3/1993 | Nuscher ..................... 296/99.1 |
| 5,310,235 | A | * | 5/1994 | Seymour et al. ........... 296/77.1 |
| 5,898,962 | A | * | 5/1999 | McNeal .................... 40/661 X |
| 5,996,863 | A | * | 12/1999 | Burke .................... 150/166 X |
| 6,068,325 | A | * | 5/2000 | Hughes ................. 296/100.16 |
| 6,216,714 | B1 | * | 4/2001 | Tucker .................... 135/88.01 |
| 6,220,647 | B1 | * | 4/2001 | Winkler ................. 296/100.14 |
| 6,227,217 | B1 | * | 5/2001 | Peta ......................... 296/83 X |
| 6,227,603 | B1 | * | 5/2001 | Brock ................... 296/100.14 |
| 6,367,181 | B1 | * | 4/2002 | Skoog ........................ 40/591 |

* cited by examiner

Primary Examiner—Joseph D. Pape
(74) Attorney, Agent, or Firm—Thompson Coburn, LLP

(57) ABSTRACT

A retractable covering for attachment to a golf cart is provided. The covering is comprised of a framework having a plurality of pivotal and nestable U-shaped rib members and a fabric cover that enables the awning to move between an extended deployed position and a retracted closed position over a rear compartment of the golf cart. The framework is mounted to the cart through one of several disclosed arrangements including a transition plate extending between the forward rib member and a top mounting bracket in one arrangement. The covering comprises a gathering flap that is adapted to surround a portion of the cover as the cover portion is retracted from use. The gathering flap has an indicia area exposed to view from behind the golf cart. The indicia area has indicia thereon that is visible from the rear of the golf cart.

25 Claims, 19 Drawing Sheets

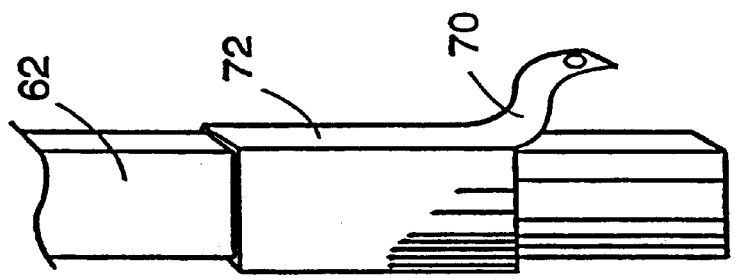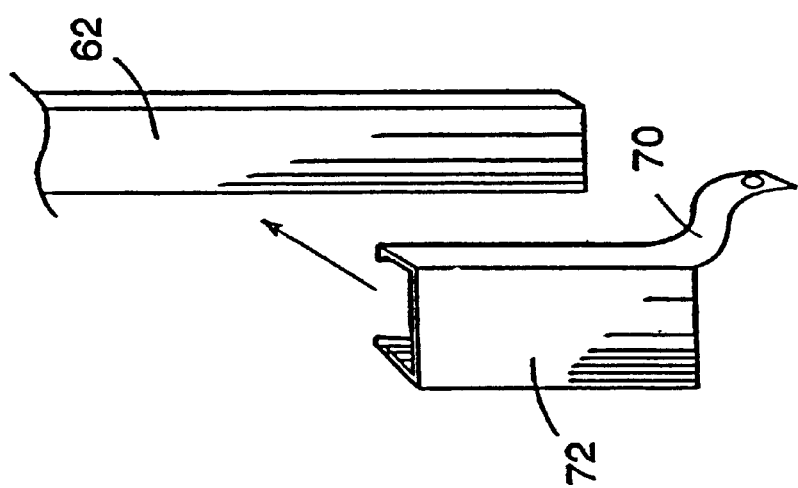
Fig. 5

METHOD AND APPARATUS FOR PROVIDING PERSONALIZING INFORMATION ON A GOLF CART

RELATED APPLICATION

This application is a continuation-in-part of application Ser. No. 09/827,327, filed Apr. 5, 2001, currently pending, which is a continuation-in-part of application Ser. No. 09/634,437, filed Aug. 8, 2000, now U.S. Pat. No. 6,220,647, issued Apr. 24, 2001.

BACKGROUND OF THE INVENTION

This invention relates to coverings and awnings for golf carts. A standard golf cart has an area for stowage of golf clubs and other equipment at the rear of the cart. While the cart's roof covers persons riding in the cart, it leaves the equipment in the stowage area uncovered. Golfing equipment can be very expensive, and it is undesirable for it to get wet because of rain. As such, a cover extending over the rear stowage area of the cart is desirable. However, ready access by a golfer to his equipment is essential, so the cover should not obstruct the golfer's ability to reach for clubs as needed. Further, if rainy conditions are not present, the cover is not needed and must be moved out of the way. There exist retractable covers that extend over the cart's stowage area, but they often do so in a cumbersome fashion. While some covers, when deployed, may do an adequate job in keeping rain off the equipment, they do not fold away in a neat, compact fashion when retracted after use. Still other disadvantages found in the prior art designs include inconvenient mounting arrangements for attaching the cover to the golf cart, supporting frameworks which are cumbersome and unduly complicated and which do not adequately support the fabric, and inadequate mounting arrangements for securing the cover to the golf cart at or near the canopy top thereof. This is especially a problem in that there are several major manufacturers of golf carts who have varying arrangements for their canopy tops, some of which have curvilinear edges not readily suited to alignment with a standardized bracket member. Furthermore, as there is concern in providing clearance for the removal and replacement of golf clubs from the golf bags as they are carried near the rear portion of the golf cart, these canopy tops are generally shortened and do not extend into the area immediately above the golf bag compartment. This then provides a challenge for the cover in that it must conveniently extend to provide adequate rain cover for golf bags but yet be readily collapsible up and out of the way of the bags and their clubs. As a result, care must be taken in designing and implementing a supporting framework. In other words, the framework must be large enough to allow for it being extended a substantial distance behind the rear portion of the top assembly which necessarily makes it "substantial" having some degree of relative size which increases its weight and complexity. With this added weight and complexity, mounting and operation become important issues as the cover must give the appearance and feel of a quality product in this luxury setting.

SUMMARY OF THE INVENTION

Among the aspects of the present invention is the provision of a retractable awning for the rear equipment stowage area of a golf cart. The awning is comprised of a framework having a fabric covering extended over a plurality of U-shaped rib members joined in pivoting relationship at their ends at a common pivot point. The rib members are moveable relative to each other so that the awning can be moved in fan-like fashion between an open, deployed position to a closed, retracted position. A first top rib member forms the top, forward lateral edge of the awning, and each successive rib member supports a portion of the fabric to give structural shape to the awning in its deployed state. Each successive rib member has an incrementally smaller dimension than its preceding rib member such that all the rib members can be nested together in a common plane when the awning is in the closed retracted position. Sleeves are disposed on the inner surface of the fabric to receive the rib members which allows the fabric to deploy smoothly over the framework. A fabric flap is provided with the awning to enable the loose awning fabric to be gathered neatly together when the awning is held against the rear edge of the cart's roof in the closed retracted state.

Several arrangements are shown for mounting the awning to the golf cart. In a first arrangement, the awning is attached to the rear of a golf cart by fastening the top rib member to the rear edge area of the roof of the golf cart. The respective pivot points of the rib members are supported against the cart's vertical support posts. Alternately, the first top rib member is supported along its vertical length to the cart's vertical support post with the pivot points being freely suspended. The support for the first top rib member may be provided in a number of ways. One option is to provide two support brackets which extend between each side of the first top rib member and its corresponding upstanding support arm provided by the golf cart manufacturer for supporting the preexisting canopy top. In this arrangement, a transition plate is provided attached to the medial portion of the first top rib member with an upturned flange with cushioning for being tucked up under the overhanging lip of the canopy top. This provides an overlapping arrangement which may either be spaced apart or urged against each other to allow for a smooth and clean transition between the add-on awning cover and the golf cart. Depending upon the choice made by the designer, the awning may thus be spaced apart from the canopy top or urged against it by locating the mounting brackets appropriately. As can be appreciated, switching between these alternatives is readily available by loosening and relocating the brackets.

Still another alternative for mounting the awning cover to the golf cart includes providing a top mounting bracket which itself is substantially U-shaped and which extends between upstanding support members of the canopy top on opposite sides of the cart and to which it may be conveniently bolted in fixed position. As a typical golf cart does not provide a support framework including a bracket or other member extending across the back of the canopy top, this top mounting bracket provides a fixed and solid connection point for the transition plate. Thus, the transition plate may itself be conveniently bolted to the top mounting bracket which in turn is bolted to the upstanding support members of the golf cart itself. This provides a solid bolted connection for supporting the awning cover to the integral framework supporting the canopy top. In several prior art designs, covers are secured to the canopy top itself instead of any supporting framework which is not particularly desirable in that the canopy tops are universally provided as molded plastic members. Thus, prior art covers attached to the molded plastic canopy top are not nearly as securely mounted to provide the solid and substantial mounting of the present invention. This can be important in that many golf carts are rented and subject to abuse by their users.

It is therefore an object of the present invention to provide a retractable awning for attachment to the rear of a golf cart to protect equipment stored in the cart's stowage area.

Another object of the invention is to provide a retractable awning having a framework comprised of rib members that nest together in planar alignment when in a closed retracted position. Still another object of the invention is to provide a retractable awning having a framework surrounding substantially the periphery of the fabric cover.

Yet another object of the invention is to provide a retractable awning having a transition plate for transitioning between the fabric awning and the canopy top of the golf cart to thereby allow the awning to be spaced further rearwardly to thereby optimize its positioning over the golf bag compartment area of the cart.

Still another object of the invention is to provide a retractable awning with a supporting framework including a top mounting bracket which itself is substantially U-shaped for being bolted to opposite sides of the golf cart upstanding support members and the transition plate to thereby provide a solid bolted connection between the forward edge of the awning and the supporting framework of the golf cart.

Another object of the invention is to provide a retractable awning having a framework including a first rib member at the forward edge of the fabric cover which itself is secured directly to the upstanding support members by a pair of brackets on each side of the golf cart to thereby securely fasten the awning cover to the golf cart without being secured to the canopy top of the golf cart.

Yet another object of the invention is to provide a retractable awning having a framework comprised of a nesting plurality of U-shaped rib members for readily being moved between an extended deployed position and a retracted stored position.

Among the other previously described aspects of the present invention is the provision of a cover for a golf cart. The golf cart has a canopy supported above a passenger compartment. The cover comprises a gathering flap that is adapted to surround a portion of the cover as the cover portion is retracted from use. The gathering flap has an indicia area exposed to view from behind the golf cart. The indicia area has indicia thereon that is visible from the rear of the golf cart.

In another aspect of the invention, an awning for covering a golf bag area of a golf cart is provided. The golf bag area is situated at the rear of the golf cart. The awning comprises a plurality of U-shaped rib members which are pivotally connected and movable from a deployed operable position to a substantially nested stored position. The awning further comprises a gathering flap for surrounding the awning when in its nested stored position. The gathering flap has an indicia area that is rearwardly facing when the gathering flap surrounds the awning in its nested position. The indicia area has indicia thereon that is visible from the rear of the golf cart.

In another aspect of the invention, an awning for covering a golf bag area of a golf cart is provided. The golf bag area is situated at the rear of the golf cart. The awning comprises a plurality of U-shaped rib members which are pivotally connected and movable from a deployed operable position to a substantially nested stored position. The awning further comprises a gathering flap having a first end detachably engaging the awning and a second end spaced apart from the first end by a length of the gathering flap. The send end detachably engages the awning in a manner so as to hold the plurality of U-shaped rib members in the substantially nested stored position. the gathering flap has an indicia area that is rearwardly facing when the gathering flap surrounds the awning in its nested position. The indicia area has indicia thereon that is visible from the rear of the golf cart.

Another aspect of the invention comprises a method. The method comprises providing a golf cart having a canopy supported above a passenger compartment and providing an awning for covering a golf bag area of the golf cart. The golf bag area is situated at the rear of the golf cart and the awning has a plurality of U-shaped rib members which are pivotally connected and movable from a deployed operable position to a substantially nested stored position. The method further comprises providing a gathering flap for surrounding the awning when in its nested stored position. The gathering flap has an indicia area that is rearwardly facing when the gathering flap surrounds the awning in its nested position. The method further comprises placing a desired indicia in the gathering flap indicia area and detachably engaging the gathering flap to the awning. The method further comprises pivoting the plurality of U-shaped rib members to the substantially nested stored position and surrounding the plurality of U-shaped members with the gathering flap thereby displaying the desired indicia in a manner where it is visible from the rear of the golf cart.

Additional objects, advantages and novel features of the present invention will be set forth in the description which follows, and will become apparent to those skilled in the art upon examination of the following more detailed description and drawings in which like elements of the invention are similarly numbered throughout.

DESCRIPTION OF THE DRAWINGS

FIG. 5 is a view showing a mounting embodiment in which the bottom portion of the awning is attached to a support post of a golf cart.

FIG. 15 is a side elevational view of the awning similar to that shown in

FIG. 14 with the addition of fabric side panels zippered in place.

DESCRIPTION OF THE INVENTION

Figure 1:
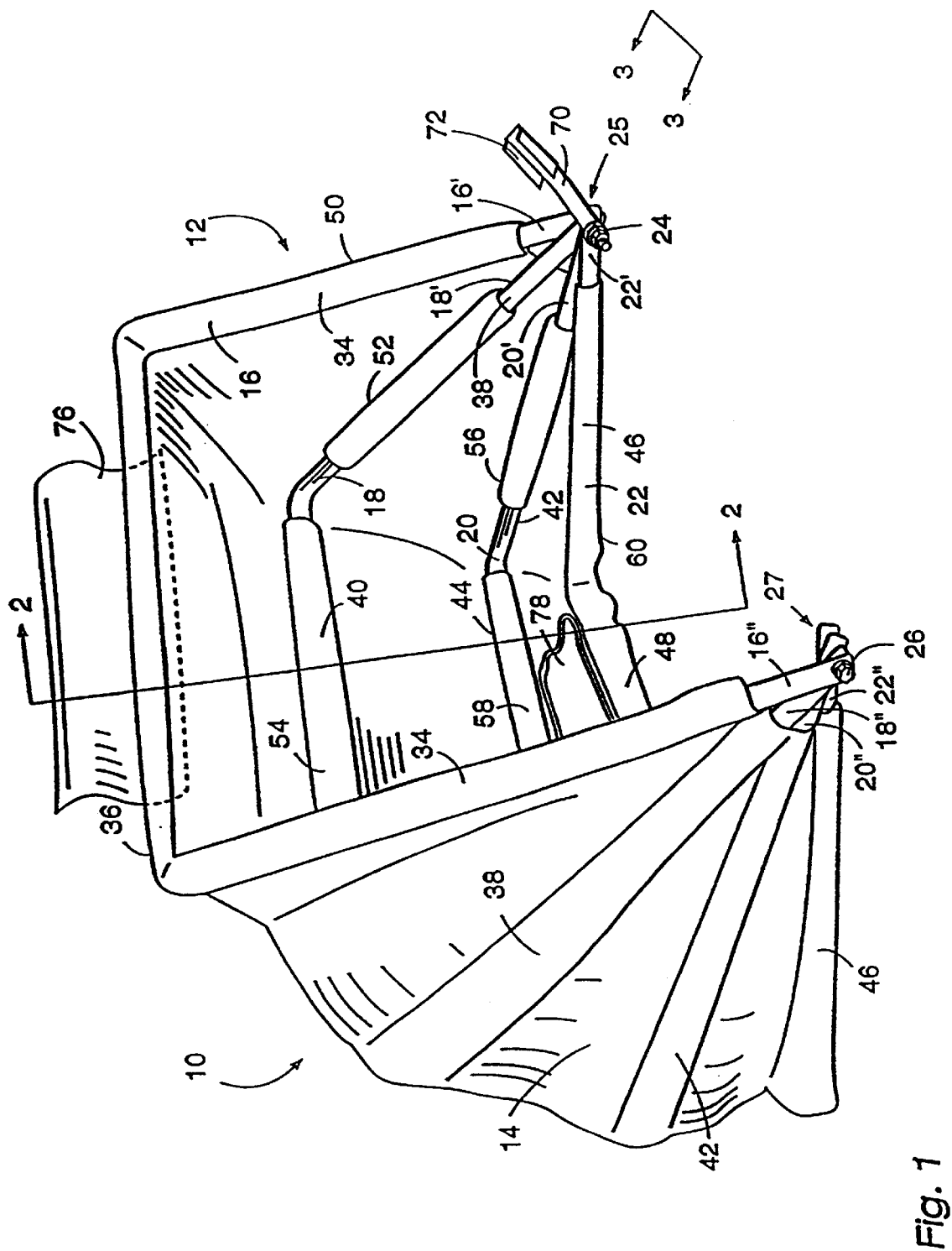
FIG. 1 is a perspective view of the awning in a partially open state.
Figure 3:
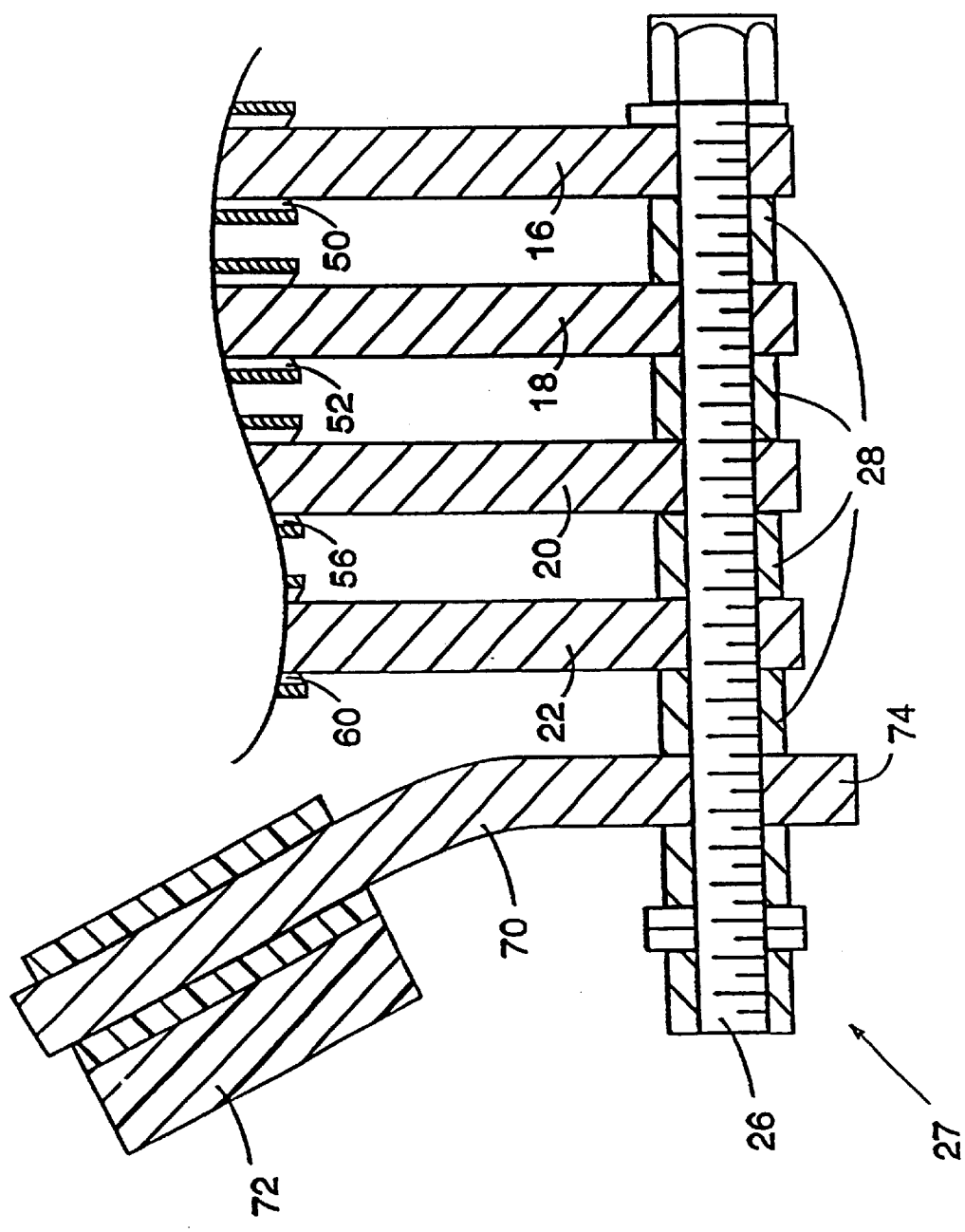
FIG. 3 is a cross-sectional view of a pivot point of the awning framework taken in side elevation along lines 3—3 in FIG. 1.

The awning attachment of the present invention, which is generally indicated by the reference numeral 10, is shown in FIG. 1. It is comprised of a framework 12 which supports a fabric covering 14. Framework 12 is comprised of a series of U-shaped rib members 16, 18, 20 and 22, each having ends 16', 16", 18', 18", 20', 20", 22' and 22", respectively. While additional, or fewer, rib members may be employed, four rib members provides the optimum number to adequately provide support for the fabric covering and give it a pleasing, gently arcuate shape. The respective rib member ends are connected together by bolts or pins 24 and 26, as shown in FIGS. 1 and 3, to create common pivot points 25 and 27, respectively, by which the rib members may be moved relative to each other. Bushings 28 are provided along bolts 24 and 26 between the rib member ends to provide adequate separation thereof to facilitate relative movement of the rib members when fanned out. A sufficient amount of fabric covering 14 is provided to enable the awning, when deployed, to extend arcuately from the rear edge section 30 of the roof of the cart to a point slightly beyond the rear edge of the cart, and to a level approximately even with the seats of the cart, so as to effectively cover the top of a golf club bag 32 held upright in the storage compartment as shown in FIG. 4.

Figure 2:
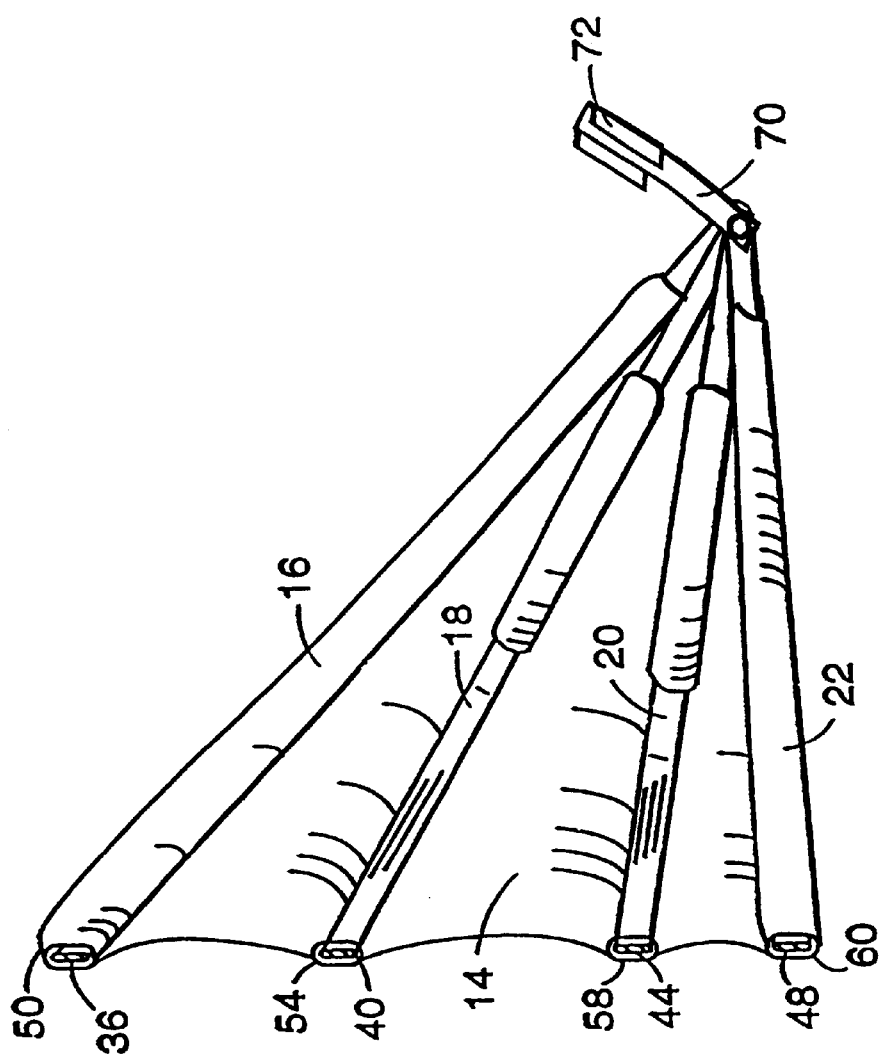
FIG. 2 is a cross-sectional view of the awning framework taken in side elevation along lines 2—2 in FIG. 1.

Sleeves are disposed on the forward and rear edges and underneath side of fabric cover 14 by sewing or the like to receive the rib members as shown in FIGS. 1 and 2. The sleeves allow a certain freedom of movement of the fabric cover along the rib members to facilitate deployment and retraction of the awning. Sleeve 50 is formed around the perimeter front lateral edge of fabric cover 14 and receives arms 34 and cross piece 36 of rib member 16. Sleeves 52 and 54 receive arm 38 and cross piece 40, respectively, of rib member 18. A corresponding sleeve 52 on the opposite interior side of fabric 14 receives the other arm 38. Similarly, sleeves 56 and 58 receive arms 42 and cross piece 44, respectively, of rib member 20. Sleeve 60 is formed around the perimeter rear lateral edge of fabric cover 14 and receives arms 46 and cross piece 48 of rib member 22.

Figure 6:
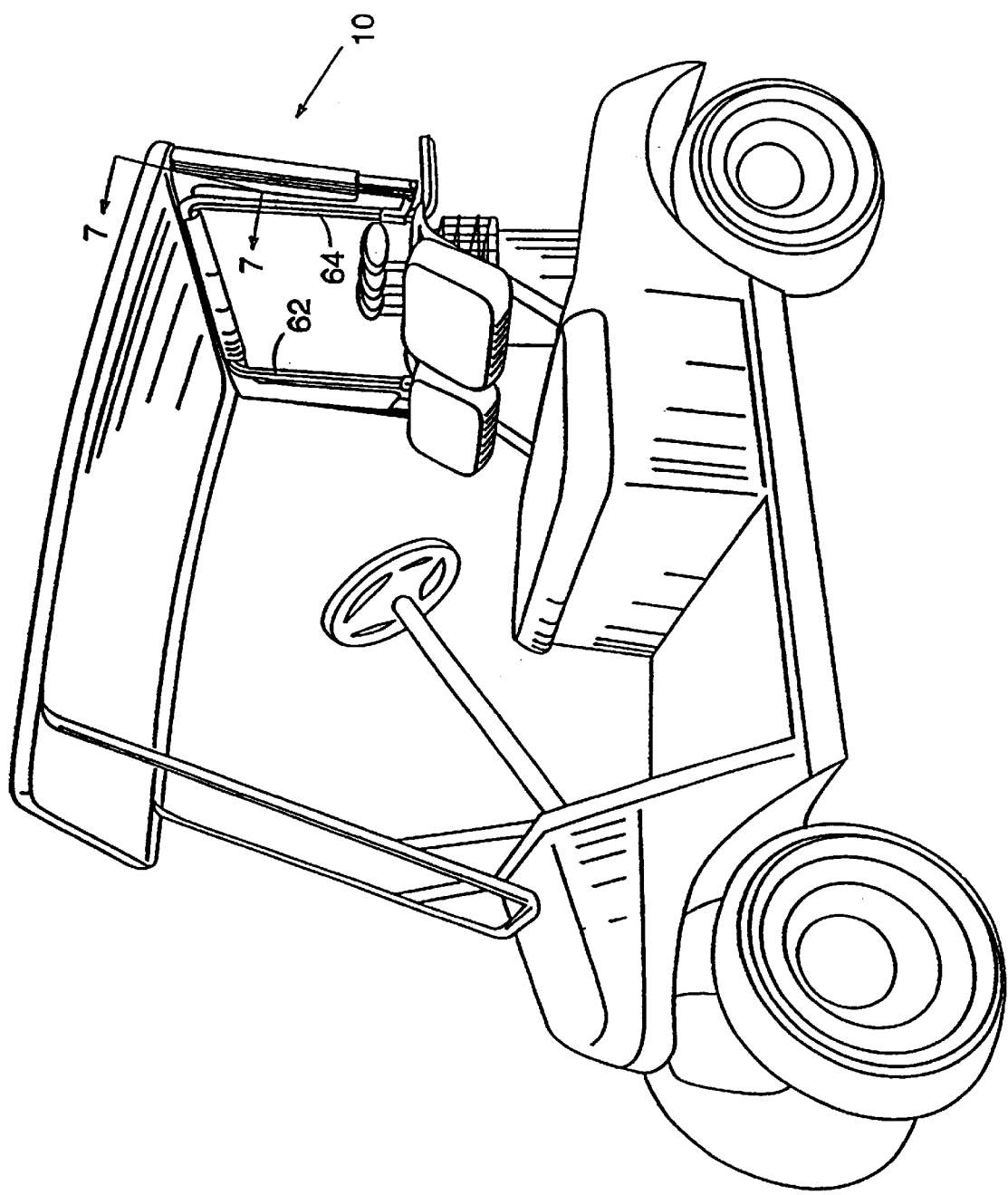
FIG. 6 is a perspective view of the awning in a retracted state on the back of a golf cart.

Each successive rib member after the first top rib member has an incrementally shorter dimension with respect to both its length and width so that the entire framework may lie substantially flat in a nesting relationship when in the closed retracted position shown in FIG. 6. As further shown in FIG. 1, rib member 16 comprises arms 34 and cross piece 36. Rib member 18 comprises arms 38, which are around ½ to one inch shorter than arms 34 of rib member 16, and cross piece 40, which is around one to two inches shorter than cross piece 36 of rib member 16. Likewise, rib member 20 comprises arms 42 and cross piece 44, which are respectively around ½ to one inch shorter than arms 38 and around one to two inches shorter than cross piece 40 of rib member 18. Further, rib member 22 comprises arms 46 and cross piece 48, which are respectively around ½ to one inch shorter than arms 42 and around one to two inches shorter than cross piece 44 of rib member 20. The dimensions may vary due to the thicknesses of the rib members and fabric cover 14 held between the rib members. This arrangement allows each successive rib member to be nested within the forwardly preceding rib member in a planar relationship. Rib members 16–22 substantially flat in cross section which facilitates their side-by-side placement at pivot points 25 and 27 and also allows the nesting relationship shown in FIGS. 3 and 6. Bushings 28 keep the rib members spaced apart to provide room for the fabric sleeve material sandwiched between the rib members.

Figure 4:
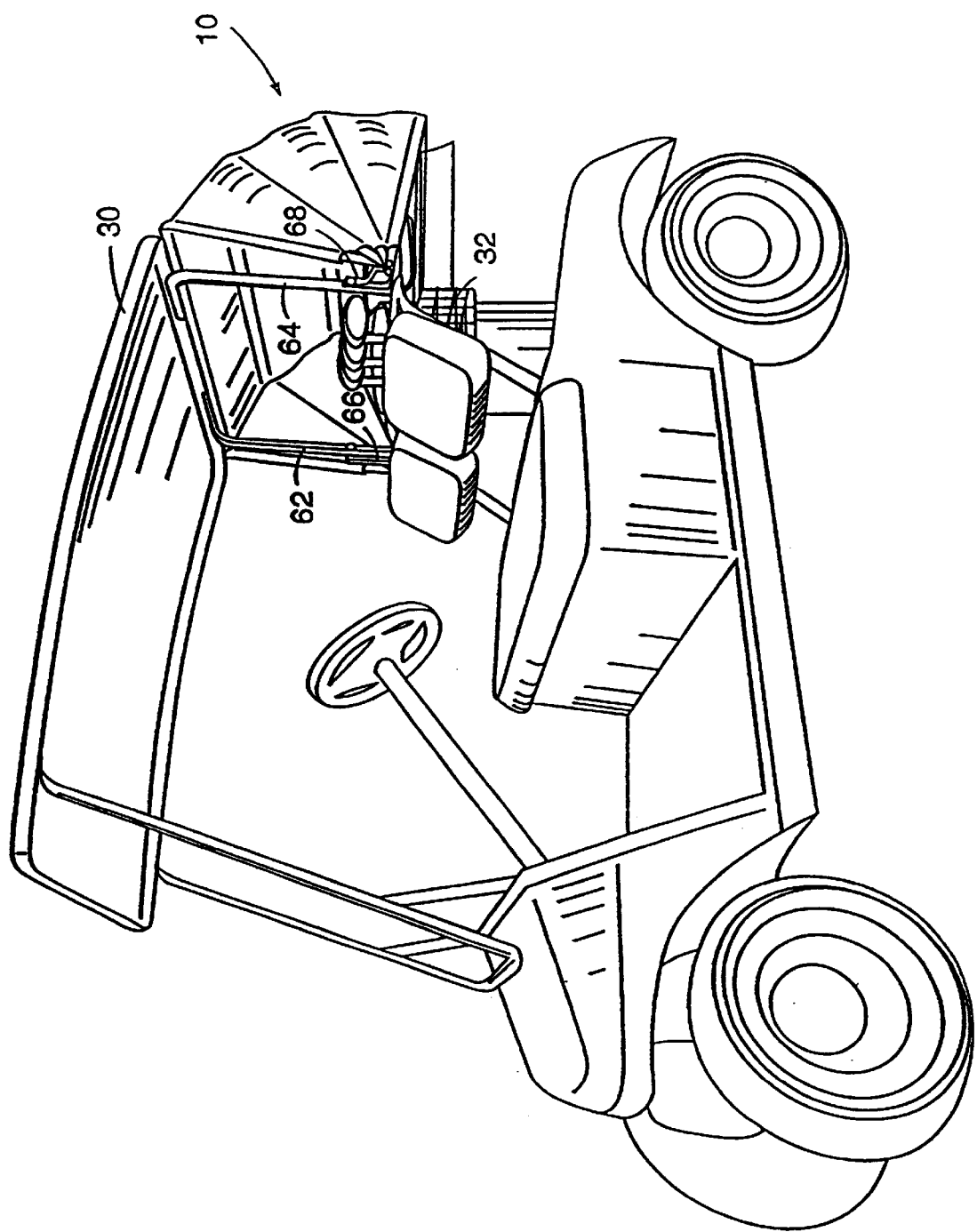
FIG. 4 is a perspective view of the awning in a deployed state on the back of a golf cart.

The awning attachment is fitted on to a golf cart as shown in FIG. 4. The forward edge of the frame structure, at the top edge of rib member 16, is connected to the underneath side of the rear section 30 of the cart's roof. Such connection can be made by providing drill holes in both the rib member and the roof to allow screwing or bolting the rib member directly into the roof section, or by any other appropriate connection means known to those skilled in the art. Preferably, the rib member should lie flush with the rear edge of the roof so that the awning remains as unobtrusive as possible. Due to the various different manufacturers of golf carts, and the various different roof designs produced by each, it may be difficult to attach the rib member flush up against the edge of the roof. This is because some roof edges may be non-rectilinear, and may have curved edges. In such instances, the rib member can not adjoin the roof edge in an aesthetically pleasing way, and, further, may not even be capable of being directly attached to the roof edge.

Figure 11:
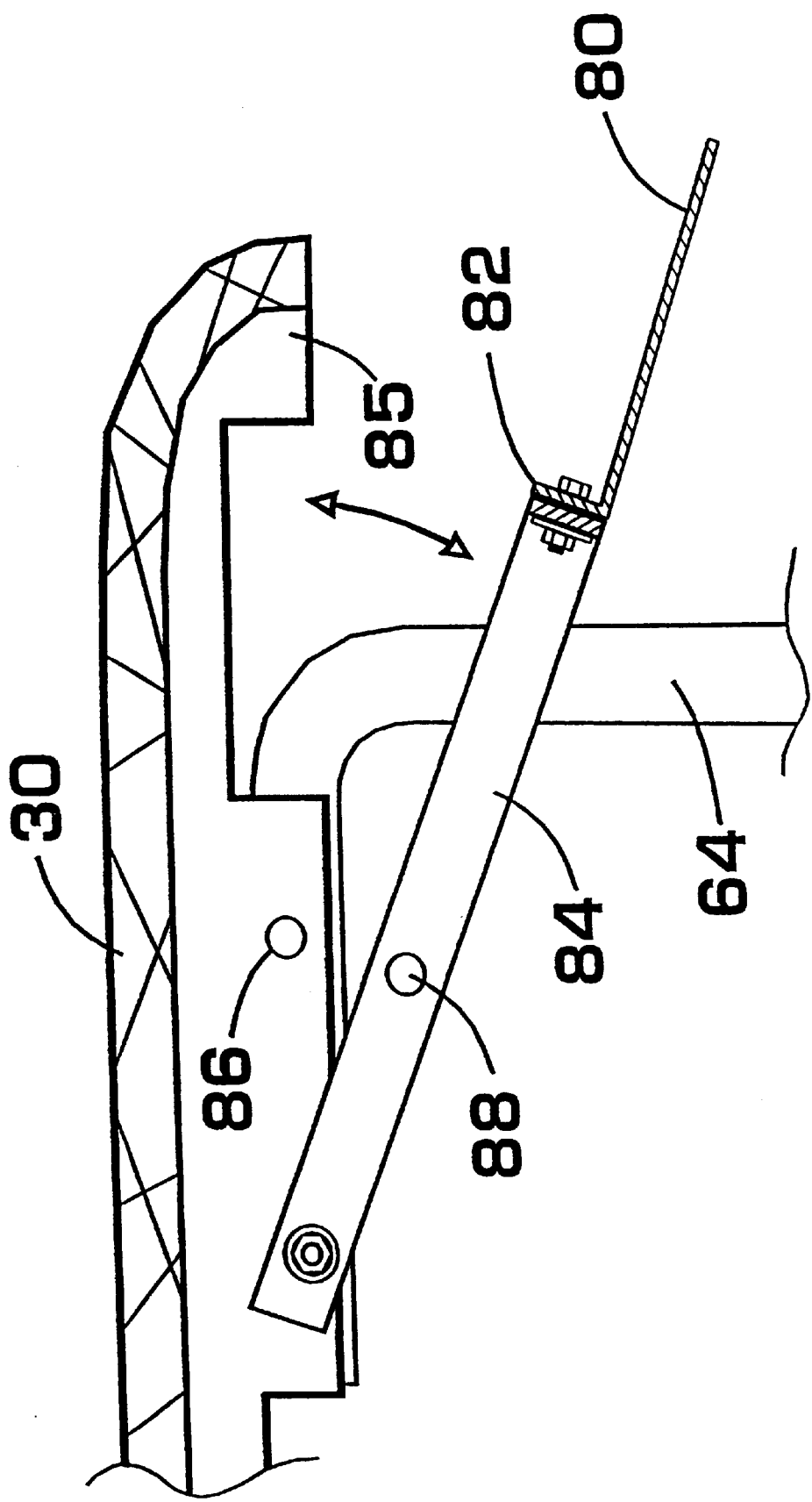
FIG. 11 is a cross-sectional view of the rear edge section of the roof of the cart showing the mounting bracket and transition plate for the alternate mounting arrangement shown in FIG. 8.
Figure 12:
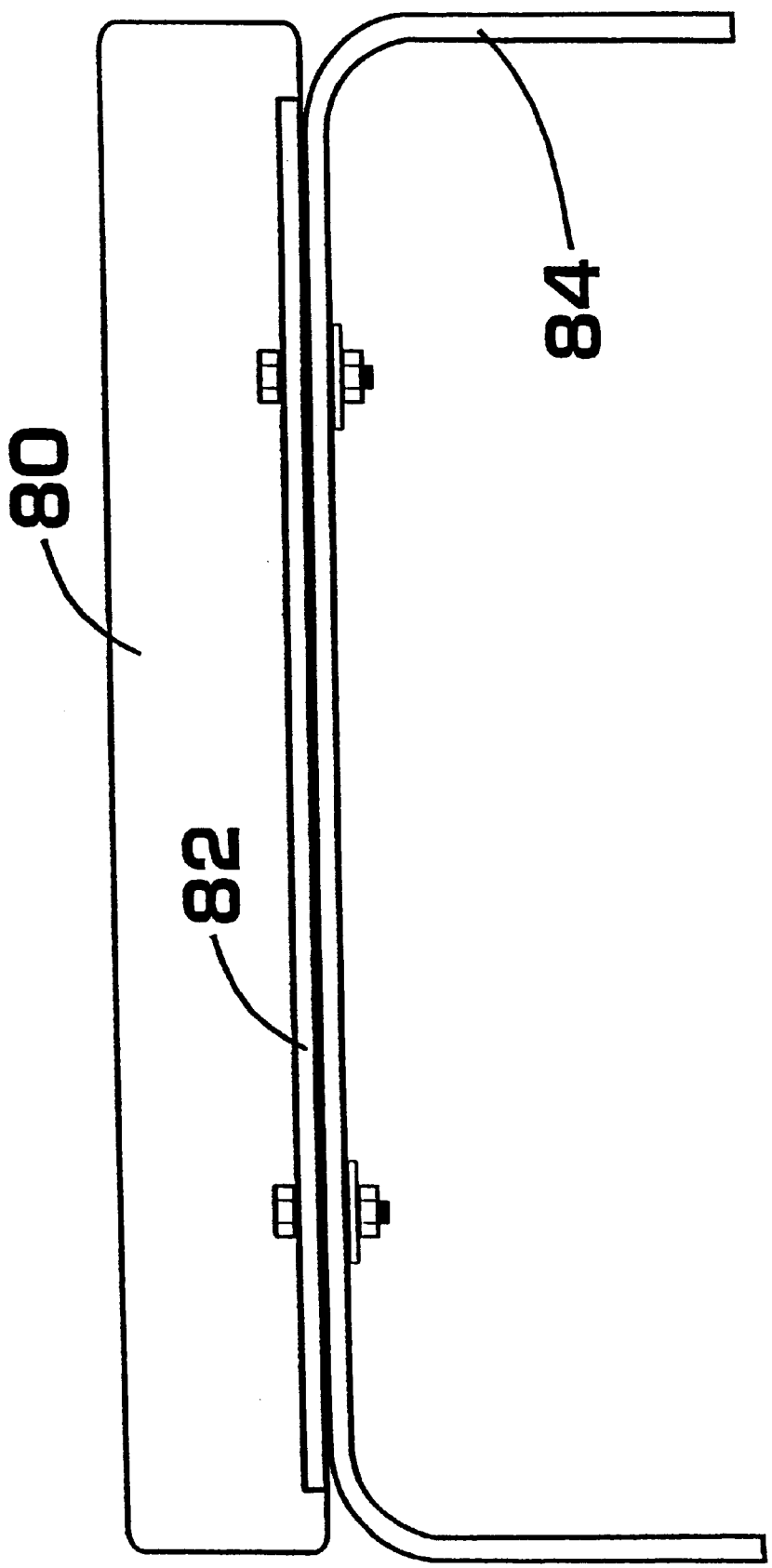
FIG. 12 is a top plan view of the mounting bracket and plate of FIG. 11.

To provide a surface for attachment of the awning at the rear edge of the cart roof, an extended transition plate member 80 against which rib member 16 may be secured is supplied. Plate member 80 is held in place by U-shaped top mounting bracket 84 as shown in FIGS. 11 and 12. Bracket 84 is secured to the underneath side of the roof of the golf cart which typically forms an interior flange 85 around the rear edge 30 of the roof. The shape of bracket 84 may be modified to accommodate the perimeter shape of the roof, which may be rectilinear or have rounded edges. Roof flange 85 can be provided with a plurality of apertures 86 around its perimeter, while bracket 84 may be provided with correspondingly placed apertures 88 to secure bracket 84 to the roof flange 85 by bolting or other appropriate fastening methods as shown in FIG. 11. Plate member 80 has a flange 82 at its forward end for connection with bracket 84 as shown in FIG. 12. Bracket 84 is optimally dimensioned such that flange 82 will be held between bracket 84 and roof flange 85.

The frame is further secured to the cart's upright, vertical support posts 62 and 64 through mounting clamps 66 and 68. These mounting clamps, as shown in FIG. 5, each comprise a metal strap 70 having a clamp 72 for engaging the cart's support post 62 or 64. Clamp 72 may comprise an open faced C-shaped channel having inwardly biased edges for holding support post in tight engagement. Alternately, a clamp having a tightening fastener, such as a threaded C-clamp, may be used. Further still, a clamp that surrounds the vertical post may be employed, and can be configured with a square or round opening to accommodate the appropriate geometrical cross section of the support post. Mounting clamps 66 and 68 each have an end 74 for mounting at pivot points 25 and 27 for the rib members of framework 12 as shown in FIG. 3. It is to be understood that the configuration of the vertical support posts of carts of different manufacturers may vary, with the posts being set wide in some cart models and set narrow in other cart models. As such, the distance of the pivot points 25 and 27 to the cart's supports will vary. To accommodate such different dimensions, the mounting clamps may be provided with different lengths of straps 70.

Figure 8:
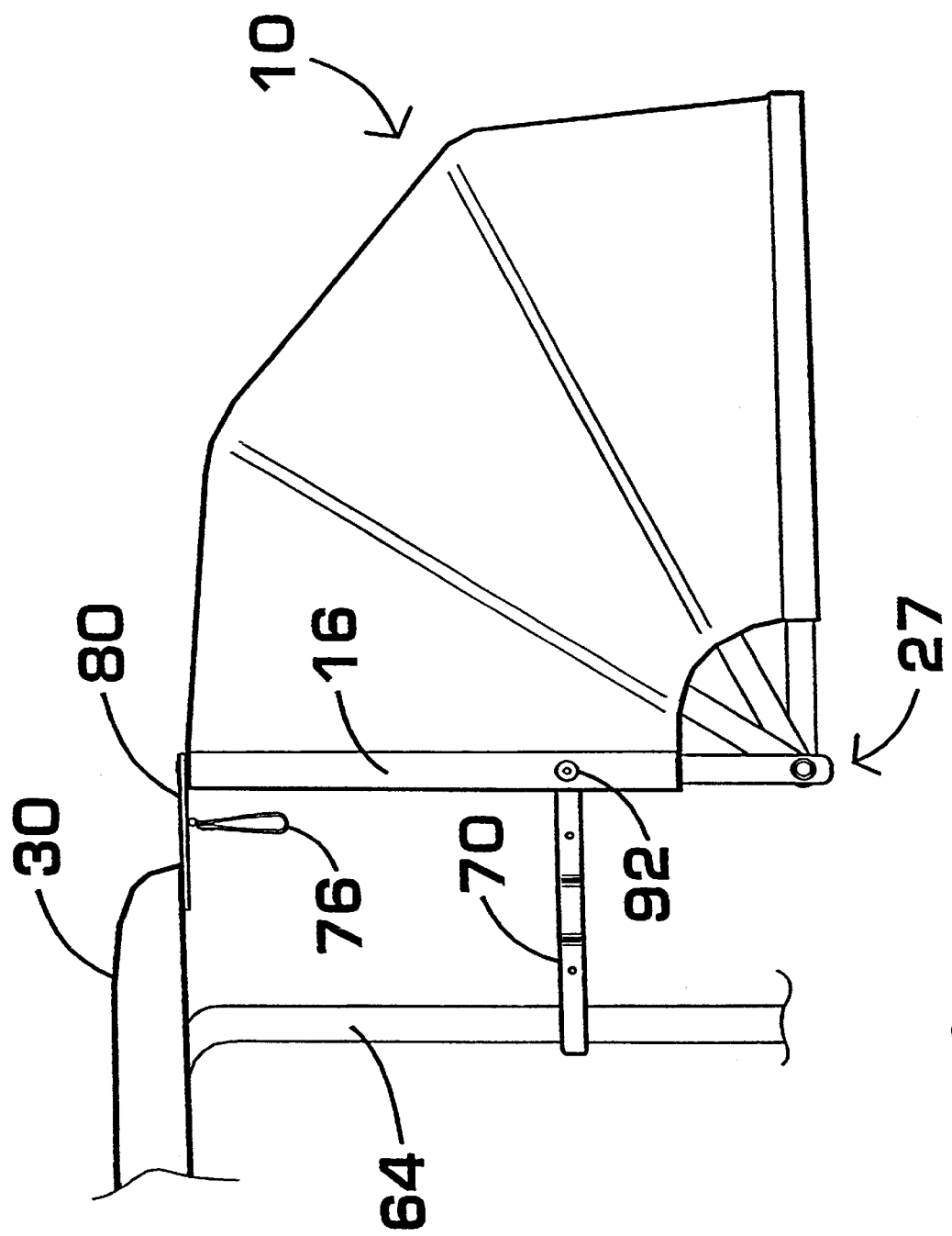
FIG. 8 is a view in side elevation of the awning mounted on the cart, in which alternate mounting arrangement is shown.
Figure 9:
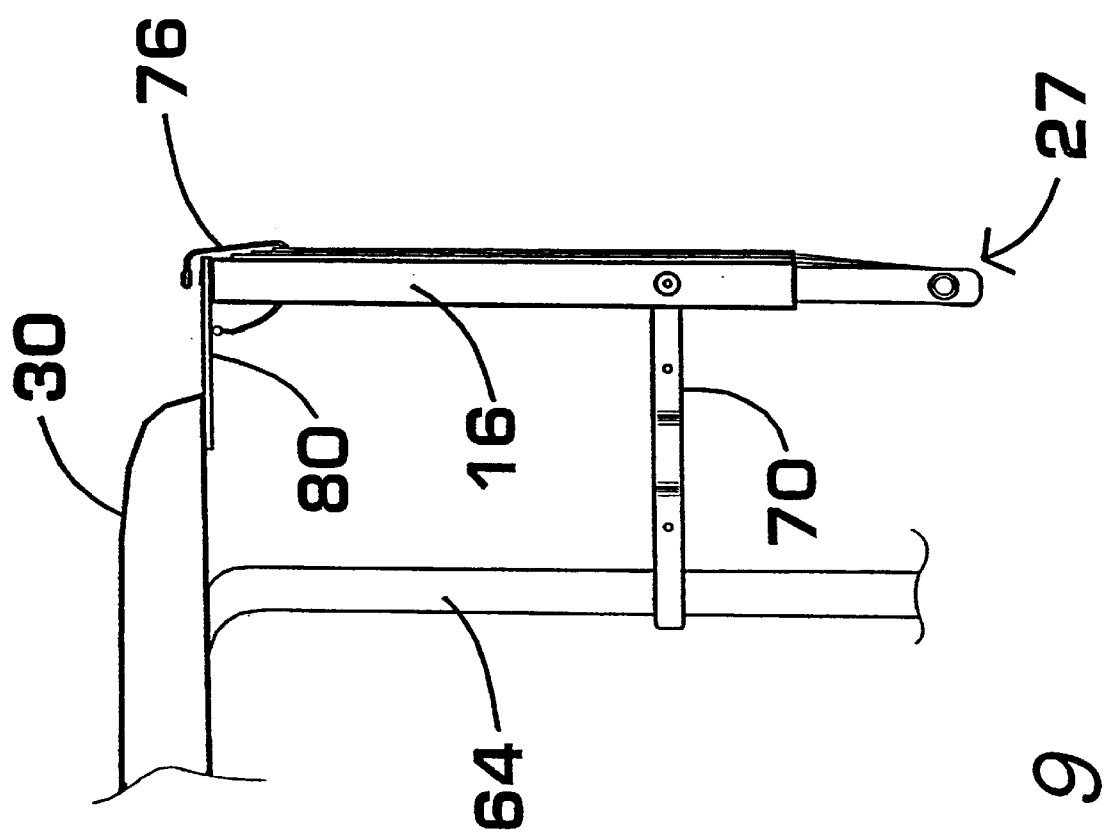
FIG. 9 is a view in side elevation of the awning mounted on the cart in the arrangement of FIG. 8, showing the rib members retracted.
Figure 13:
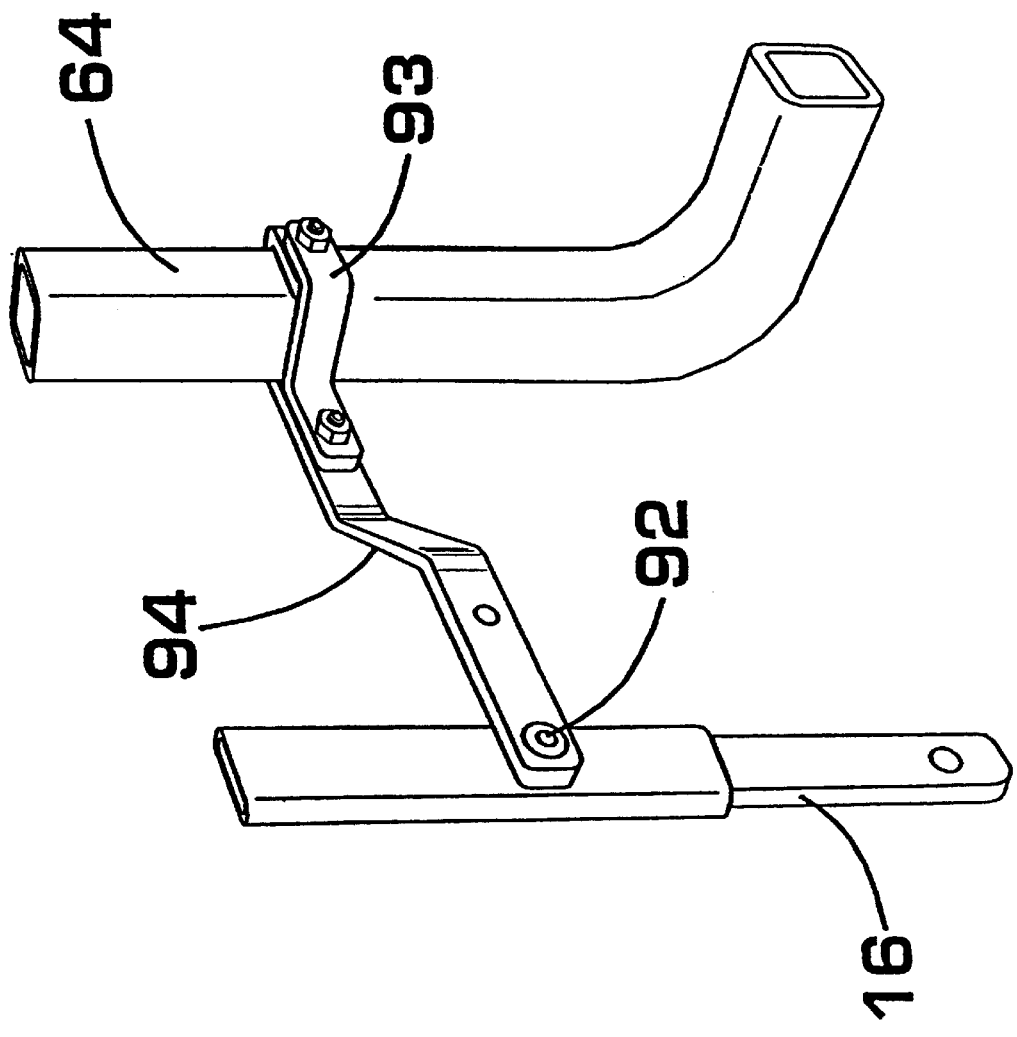
FIG. 13 is a perspective view of the bracing arm which connects the rib member of the awning to the vertical support post of the cart.

The frame may alternately be mounted to the vertical support posts of the golf cart from a position on rib member 16 remote from pivot points 25 and 27. In such cases, connecting metal straps 70 would be moved from the pivot point (as shown in FIG. 3) and instead be positioned along a median portion of rib member 16 as shown in FIGS. 8 and 9. This particular positioning of strap 70 on rib member 16 further provides a greater degree of overall stability to the attached awning, as pivot points 25 and 27 are sufficiently stable due to the interconnection of the rib members and do not need supplemental stabilization. Strap 70 may be simply connected to rib member 16 by bolting 92 or other appropriate fastener. The remote end 90 of strap 70 may be fastened to the cart's vertical support posts 62 and 64 by direct bolting, or may be provided with a clamp 93 for engagement around the support post. To accommodate the different spacing of the vertical support posts on carts of different manufacturers, strap 70 may be configured with an offset angle 94 as necessary to reach to a vertical post set wider than the awning as shown in FIG. 13. Likewise, the offset angle can be configured to connect to a vertical post set narrower than the awning.

Figure 7:
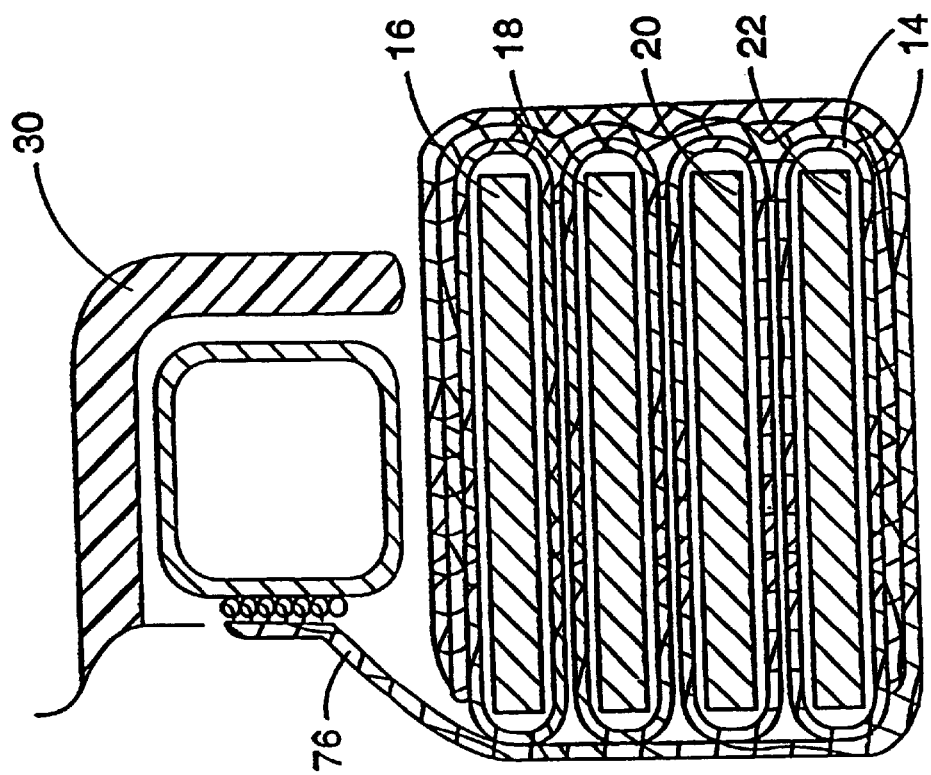
FIG. 7 is a cross-sectional view of the nested rib members comprising the awning framework taken in side elevation along lines 7—7 in FIG. 6.

To hold the loose fabric material of cover 14 in a neat bundle when the awning is in the closed, retracted position, a gathering flap 76 is provided on the top section of cover 14. FIG. 1 shows flap 76 extending along the substantial width of cross piece 36 of rib member 16, being secured to the fabric by sewing or the like along that end. The free end is provided with snaps or hook and loop fastening material. When the awning is in the open, deployed position, gathering flap 76 lies loosely on the top of fabric covering 14 on the back of the awning. It is not long enough, however, so that it dangles below the rear bottom edge of the awning. When the awning is folded up into its closed, retracted position, gathering flap is wrapped around the nested rib members and secured by its snaps or hook and loop fastening means to corresponding fastening means on the forward lateral edge of the framework of the awning or to the underneath side of the roof of the cart as shown in FIGS. 6 and 7.

Figure 10:
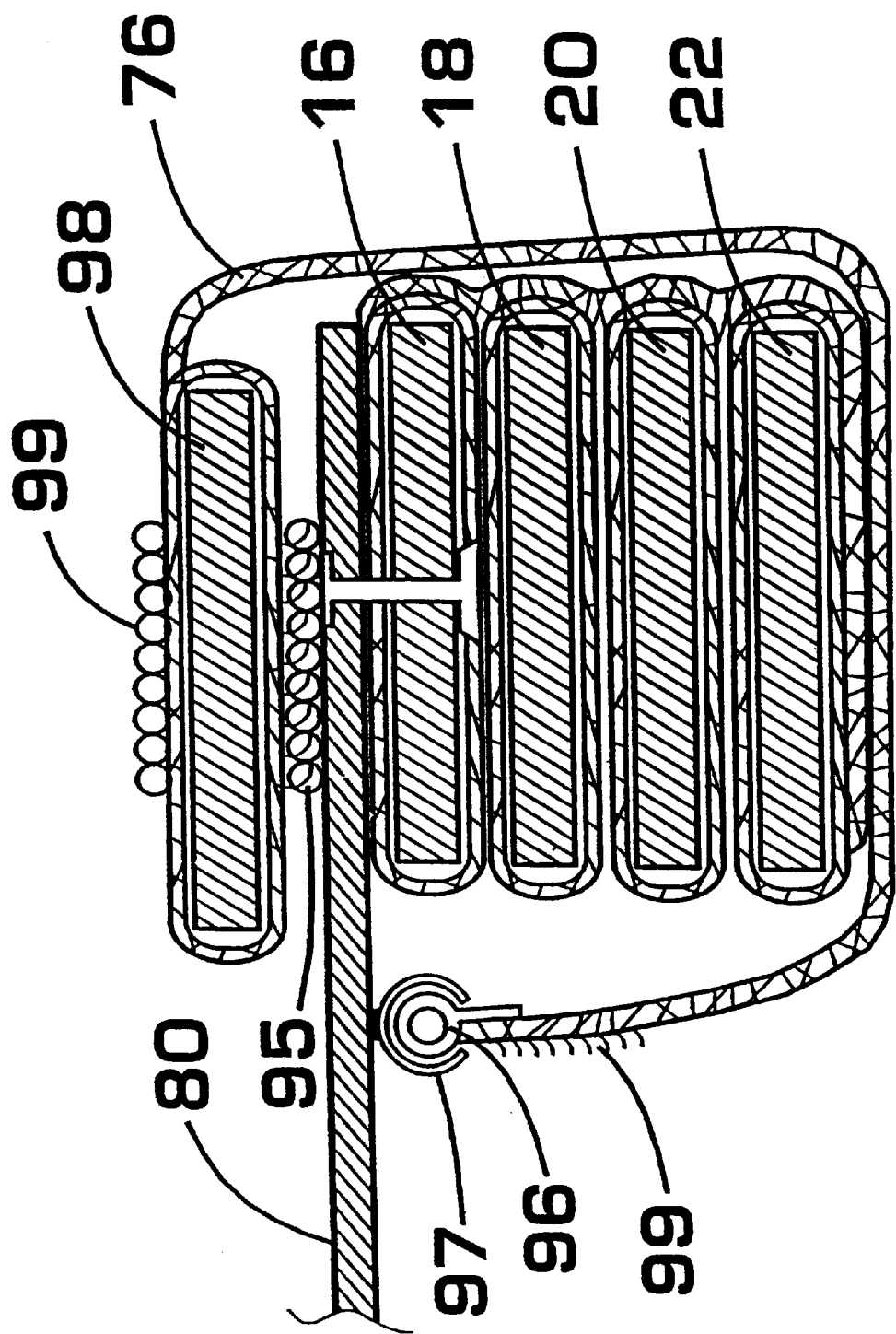
FIG. 10 is a cross-sectional view of the nested rib members in FIG. 9.

When the awning is attached to the golf cart by using extended transition plate member 80, the orientation of gathering flap 76 may be reversed, by securing the base end 91 underneath plate member 80 and configuring flap 76 to be drawn around the nested rib members and secured to the top of plate member 80, as shown in FIG. 10, by appropriate fastening means previously described. The gathering flap 76 may be constructed to be removable from its securement under plate member 80 using various fastening means, such as a zipper, hook and loop fastening means, etc. For a reinforced connection, flap end 91 may be provided with a dowel or webbing member 96 at its edge, and a C-channel 97 may be secured underneath plate member 80 to slidably receive the dowel or webbing member of flap end. A stiffener member 98 may be provided at the remote end of flap 76 to provide a certain amount of weight and rigidity so the flap end will be resistant to curling and be made easier to handle. Also, a fastener 99 may be provided at the remote flap end so that flap 76 may be doubled back on itself when not in use.

By having the gathering flap extend the substantial width of the framework, it avoids unsightly bulging out of material that would be present if narrow gathering strips were instead used. As an additional advantage, the wide gathering flap allows for a clear vinyl pocket for printed material to be placed therein which presents a useful marketing tool for advertisers during golf tournaments.

Figure 14:
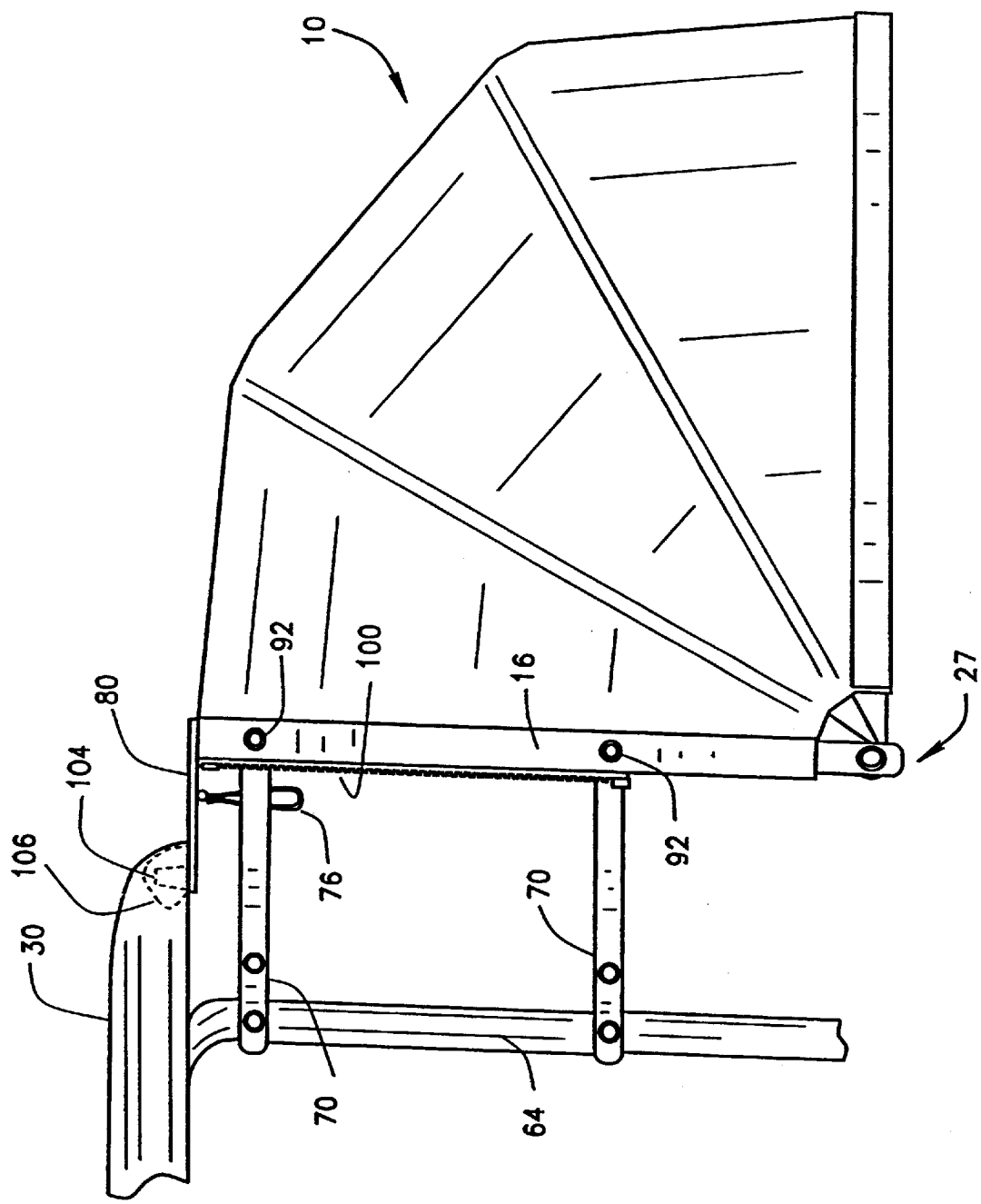
FIG. 14 is a view in side elevation of the awning mounted on the cart with a pair of bracing arms or brackets at each side thereof.
Figure 15:
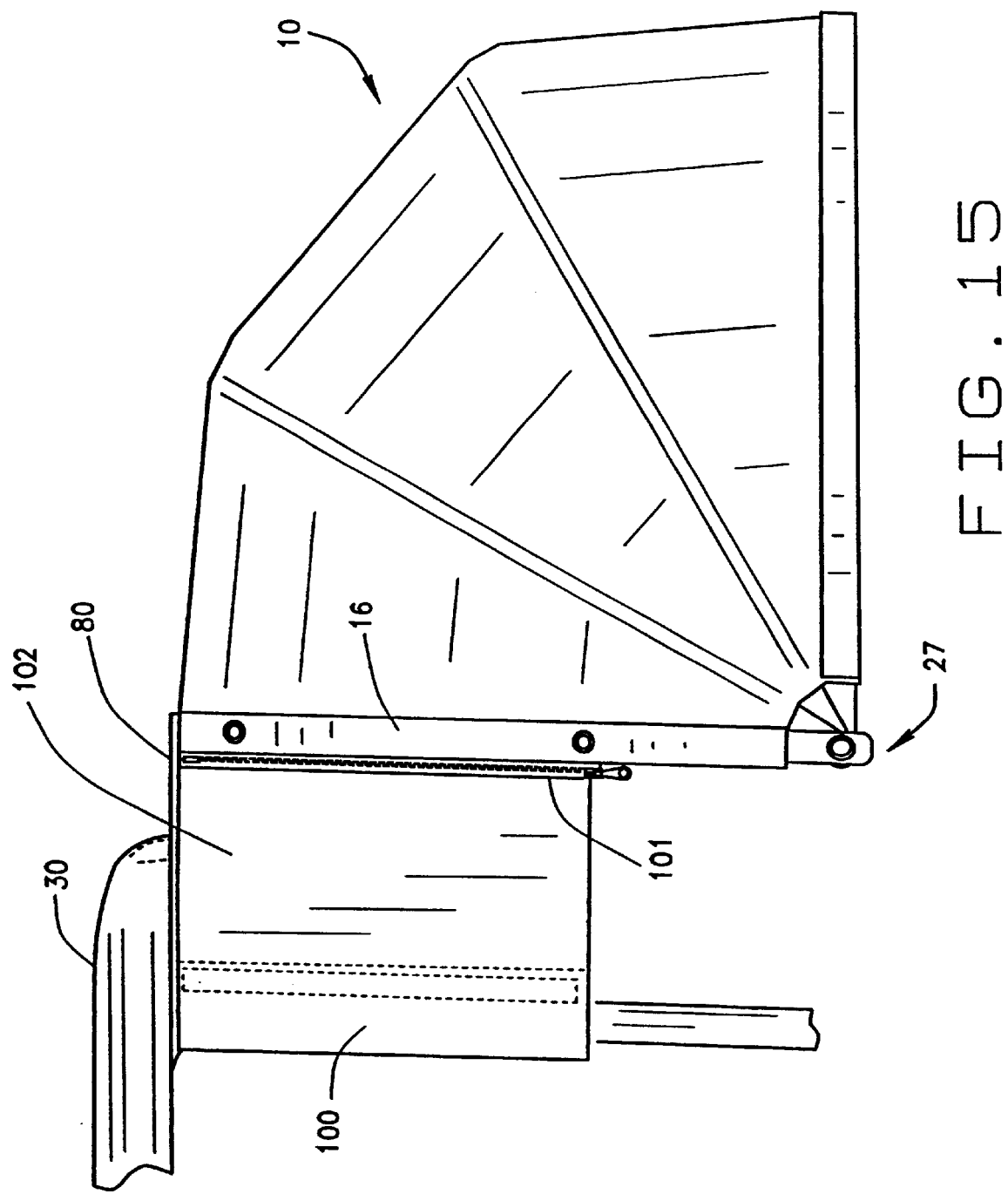

Referring to FIGS. 14 and 15, a zipper 100 or hook and loop material may be provided along an edge of the fabric cover for the selective placement of a fabric panel 102, as desired for shielding from view the connecting metal straps 70 which may be used to support the awning cover from the vertical support posts 62, 64. Furthermore, in the arrangement as shown in FIGS. 14 and 15, the transition plate 80 may not be secured to the rear section 30 of the cart's roof and instead may merely have an upstanding flange 104 with a protective cushion covering 106 for resiliently engaging the lip of the golf cart top 30. In this arrangement, the straps 70 provide the sole means of support for the awning cover from the vertical posts 62, 64. Although an arrangement shown in FIGS. 14 and 15 indicating that the transition plate 80 and its upturned flange 104 may be conveniently urged against the canopy top 30 of the golf cart, this need not be the case as the straps 70 may merely be repositioned to provide a space between flange 104 with cushioning member 106 and the golf cart top 30.

Figure 16:
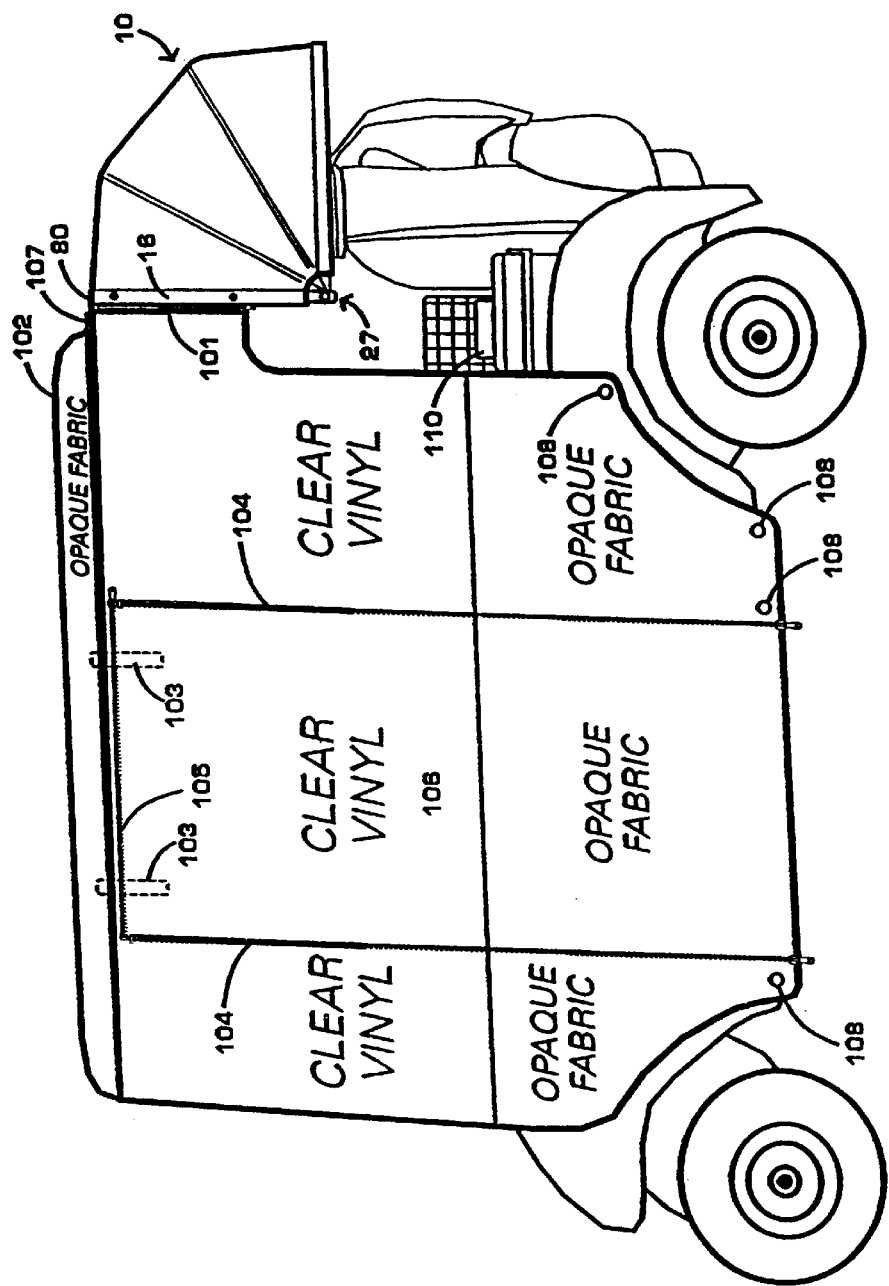
FIG. 16 is a side elevational view of a golf cart with a total enclosure and an awning cover mounted to the back of the golf cart.

As shown in FIG. 16, the awning cover 10 of the present invention is readily adaptable to being used with a total enclosure as is presently being marketed by others and which provides an all weather enclosure for the golf cart.

Figure 17:
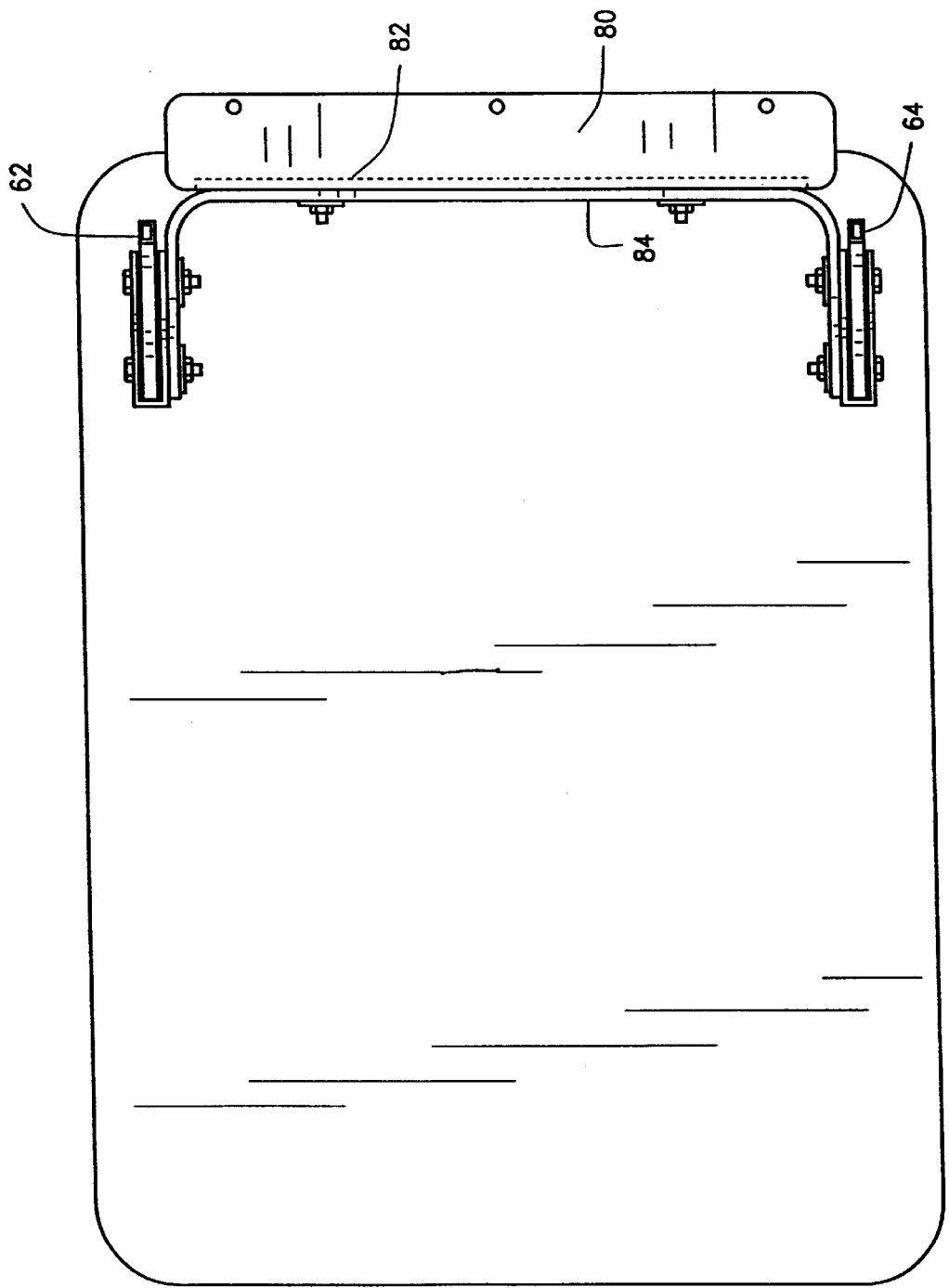
FIG. 17 is a bottom view of a canopy top for a golf cart detailing the top mounting bracket bolted to the vertical support posts of a cart as well as the transition plate.
Figure 18:
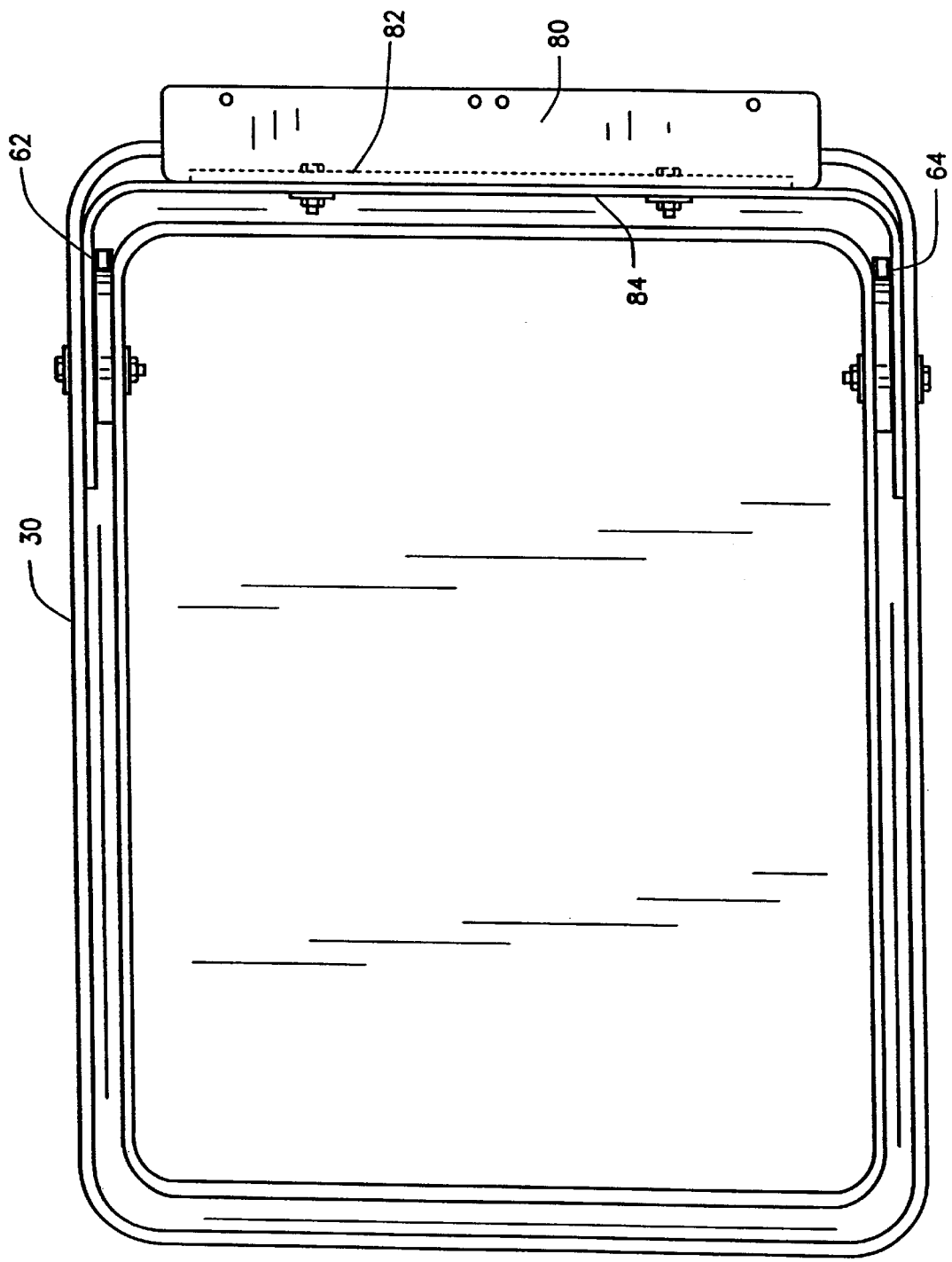
FIG. 18 is a bottom view of a canopy top of a golf cart different than that shown in FIG. 17 and detailing the location of the top mounting bracket in a different arrangement.

As shown in FIGS. 17 and 18, bracket 84 may be provided in different form to suit the canopy top arrangement as used by different manufacturers. In the arrangement as shown in FIG. 17, top mounting bracket 84 conveniently mounts with the existing pair of bolts at either side thereof to the vertical support posts 62, 64 and at their inner surfaces. On the other hand, as shown in the arrangement of FIG. 18, top mounting bracket 84 may conveniently fit between vertical support posts 62 and the plastic canopy cover 30 and, again, be held in place by bolted connections as shown. In either arrangement, top mounting bracket 84 provides a convenient flat planar surface against which the upturned flange 82 of transition plate 80 may be readily abutted and mounted with its own mounting bolts to provide a secure connection between the awning cover and the supporting framework of the golf cart top assembly.

Figure 19:
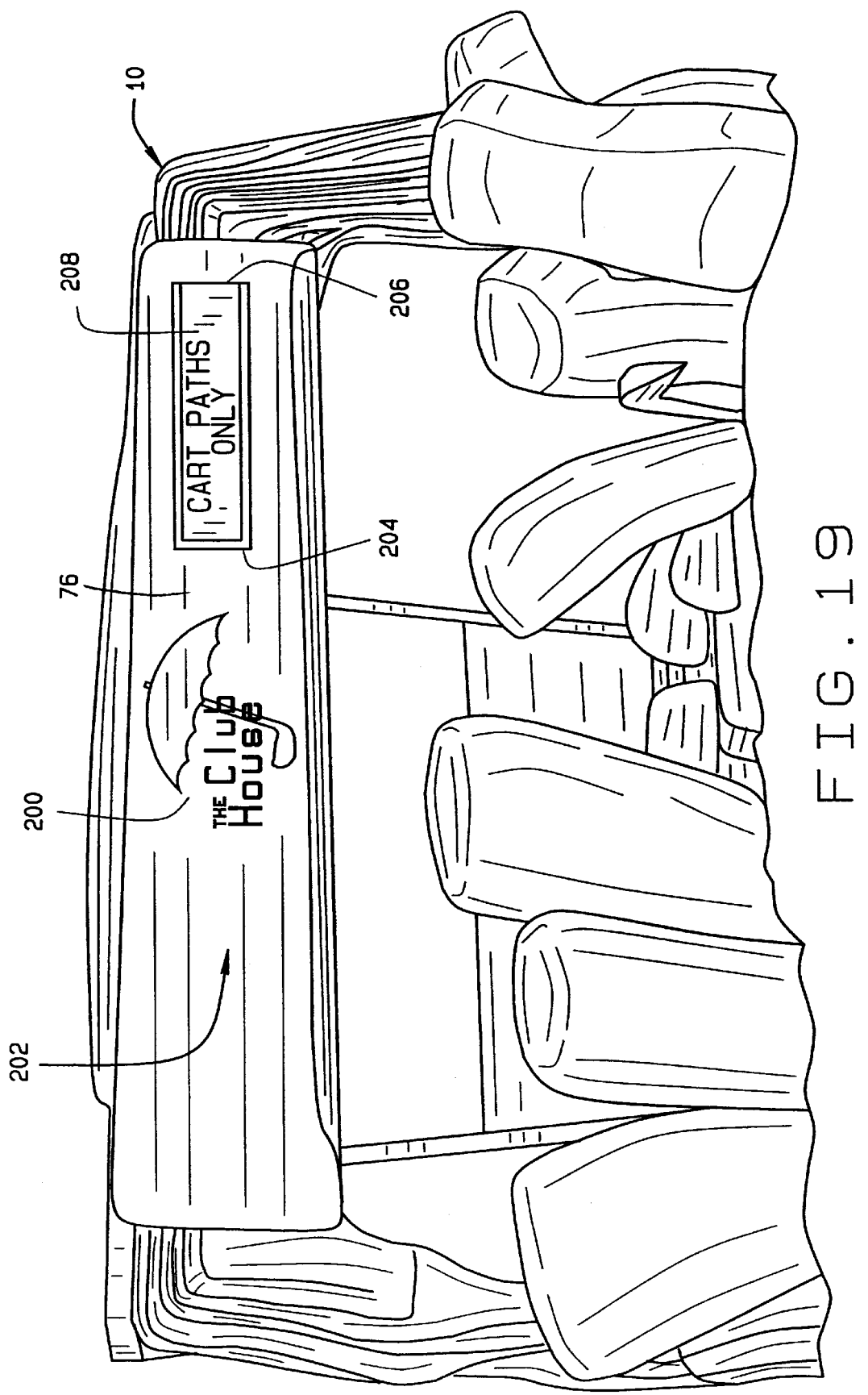
FIG. 19 is a partial rear elevational view of the awning of FIG. 1 with a gathering flap of the awning displaying indicia.

As shown in FIG. 19, the gathering flap 76 may be provided with indicia 200 in an indicia area 202 on its outer exposed surface that may be viewed from the rear of the golf cart. The indicia 200 may be advertising or the indicia may be used to personalize the golf cart or to display other information relevant to the game of golf, including identifying the starter, providing course instructions or to provide tournament information, etc. The indicia 200 may be applied directly to the gathering flap 76 through many methods known in the art including preferably embroidery or less preferably screen printing. As stated previously, when the awning cover 10 is folded up into its closed, retracted position, the gathering flap 76 is wrapped around the nested rib members 12. Preferably, the indicia area 202 is positioned on the gathering flap 76 so that the indicia 200 is visible from the rear of the golf cart when the awning is in its retracted position and the gathering flap surrounds the nested members 12. Additionally, the gathering flap 76 may be provided with a transparent window 204 that forms a pocket or a sleeve 206 in a portion of the gathering flap 76. The pocket or sleeve 206 is adapted for the ready insertion of additional indicia 208 therein. As the indicia 200 may change periodically, it is preferred to arrange the gathering strap 76 to be removable from the golf cart and/or awning as in one of the methods previously described.

Method of Use

The retractable awning of the present invention provides a useful attachment to the rear of a golf cart to keep equipment dry during rainy periods. It is very simply employed by pulling apart the rib members in fan-like fashion to create the arcuate structure of the awning. When a golfer needs to access her equipment and reach for a club, she need merely raise the edge of the awning to a sufficient degree to be able to reach in to the golf bag. When the rainy conditions no longer exist, the framework is simply pivoted into its closed retracted state. The nesting arrangement of the rib members allows for a neat, compact arrangement. Gathering flap 76 is then wound around the rib members to neatly bundle the fabric material. The awning of the instant invention, however, need not only be used for rainy conditions; it can also be used as a screen to protect the cart occupants from the rays of the sun and or very windy days. Thus, the awning can be kept in its open deployed state all the time. If desired, a window 78 may be formed in the rear of the awning using transparent plastic or the like and a pocket or sleeve with transparent window may be provided for the ready insertion of advertising or signage.

The gathering flap 76 may also be used to display the indicia from the golf cart. The gathering flap 76 may be provided with the desired indicia 200 in the indicia area 202 of the gathering flap. Additional indicia 208 may be received in the pocket 206 as desired. The gathering flap 76 may be installed onto the golf cart by attaching it to the awning 10 and/or golf cart using one of the methods previously described. When the indicia is desired to be displayed, the awning 10 may be moved to its closed, retracted position. The gathering flap 76 may then be wrapped around the nested members 12 to hold the awning 10 in the retracted position. In doing so, the indicia area 202 of the gathering flap 76 is positioned in a manner so as to be rearwardly facing where the indicia 200 is visible on the gathering flap from the rear of the golf cart. Also, if used, the additional indicia 208 in the pocket may be visible through the window 204. When the indicia is desired to be concealed, the gathering flap 76 may be removed from the golf cart and/or awning 10 as previously described. Additionally, depending on the method of attaching the gathering flap 76 to the golf cart and/or awning 10, the awning may be placed in its open, deployed position and the gathering flap may be doubled back on itself, as previously described.

When the additional indicia 208 is desired to be changed, the gathering flap 76 may be wrapped around the nested member of the awning, the pocket 206 may be accessed, the indicia removed and new indicia inserted therein. When a new gathering flap with new indicia 202 is desired, the gathering flap may be removed from the awning/and or golf cart as previously described and a new gathering flap with the desired indicia may be installed thereon.

Various changes and modifications may be made within this invention as will be apparent to those skilled in the art. For example, the indicia may be personal information such as the name of the owner of the golf cart, as golf carts are many times individually owned and used for transportation in and around golf, retirement, and other communities. Furthermore, the indicia may be applied in any one or more of several ways, limited only by the imagination of the user. Examples include embroidery, screen printing, various painting techniques, iron on decals, etc. The indicia may also serve other purposes, such as advertising a particular event such as a golf tournament, etc. The covers as noted above are virtually universal so that they may also be provided as advertising "freebees" and handed out to various attendees or participants at conferences, meetings, tournaments, etc. so that the recipient may take the customized and personalized cover back home for his own personal use. The indicia area may also allow attachment of an indicia through reusable means, such as hook and loop fasteners such as Velcro™. This would be particularly useful for carts and covers owned by a golf course or other facility where more than one operator of the golf cart would be customary. Another example would be for a golf or country club to have removable indicia panels with its members names so that as a member would require use of a golf cart an attendant could attach the indicia panel bearing his name to the flap to thereby identify his cart which would add that personal touch so often sought after by prestigious facilities. Such changes and modifications are within the scope and teaching of this invention as defined in the claims appended hereto.

What is claimed is:

1. A covering for a golf cart wherein the golf cart has a canopy supported above a passenger compartment, the covering comprising:

a gathering flap being adapted to surround a portion of the covering as the covering is retracted from use, the gathering flap having an indicia area exposed to view from behind the golf cart, the indicia area having indicia thereon visible from the rear of the golf cart.

2. The covering of claim 1 wherein the gathering flap has a sleeve attached to the gathering flap in the indicia area, the sleeve having a substantially transparent window therein so that a sign may be placed in the sleeve and viewed through the substantially transparent window from a location behind the golf cart.

3. The covering of claim 1 wherein the covering comprises an awning for the golf bag area of the cart and the gathering flap surrounds the awning as the awning is retracted from use.

4. The covering of claim 1 wherein the indicia comprises commercial advertising.

5. The covering of claim 1 wherein the indicia comprises personalized information.

6. The covering of claim 1 wherein the indicia comprises golf course information.

7. The covering of claim 1 wherein the flap is detachable from the golf cart.

8. The covering of claim 1 further comprising an indicia panel, the indicia panel being detachable from the gathering flap and having the indicia applied thereto.

9. An awning for covering a golf bag area of a golf cart wherein the golf bag area is situated at the rear of the golf cart, the awning comprising:

a plurality of U-shaped rib members which are pivotally connected and movable from a deployed operable position to a substantially nested stored position; and a gathering flap for surrounding the awning when in its nested stored position, the gathering flap having an indicia area that is rearwardly facing when the gathering flap surrounds the awning in its nested position, the indicia area having indicia thereon that is visible from the rear of the cart.

10. The awning of claim 9 further comprising an attachment for attaching the gathering flap in a folded over orientation when it is not surrounding the awning in its stored nested position.

11. The awning of claim 9 wherein the gathering flap is attached to a top section of the awning, the gathering flap overlying a top of the awning when the awning is in its deployed position.

12. The awning of claim 9 wherein the gathering flap further comprises a sleeve arranged in the indicia area, the sleeve having a substantially transparent window therein so that a sign may be placed in the sleeve and viewed through the substantially transparent window from a location behind the golf cart when the awning is in the deployed position.

13. The awning of claim 12 wherein the sleeve is spaced apart from the indicia so as to not obscure either the transparent window or the indicia.

14. The awning of claim 9 wherein the flap is detachable from the golf cart.

15. The awning of claim 9 further comprising an indicia panel, the indicia panel being detachable from the gathering flap and having the indicia applied thereto.

16. An awning for covering a golf bag area of a golf cart wherein the golf bag area is situated at the rear of the golf cart, the awning comprising:

a plurality of U-shaped rib members which are pivotally connected and movable from a deployed operable position to a substantially nested stored position; and a gathering flap having a first end detachably engaging the awning and a second end spaced apart from the first end by a length of the gathering flap, the second end detachably engaging the awning in a manner so as to hold the plurality of U-shaped rib members in the substantially nested stored position, the gathering flap having a rearwardly facing indicia area when the gathering flap surrounds the awning in its nested position, the indicia area having indicia thereon that is visible from the rear of the cart.

17. The awning of claim 16 wherein the awning further comprises a transition plate interposed between a top section of the golf cart and a top section of the awning, the first end detachably engaging an underside of the transition plate and the second end detachably engaging an opposite top side of the transition plate in holding the plurality of U-shaped rib members in the substantially nested stored position.

18. The awning of claim 17 wherein the gathering flap first end comprises a dowel member and the transition plate underside comprises a C-shaped channel and the C-shaped channel is dimensioned to slidably receive the dowel member in detachably engaging the gathering flap first end to the awning.

19. The awning of claim 17 wherein the gathering flap first end and the transition plate underside comprise a zipper connection in detachably engaging the first end to the awning.

20. The awning of claim 17 wherein the gathering flap first end and the transition plate underside comprise a hook and loop fastening mechanism in detachably engaging the first end to the awning.

21. A method comprising:

providing a golf cart having a canopy supported above a passenger compartment;

providing an awning for covering a golf bag area of the golf cart wherein the golf bag area is situated at the rear of the golf cart, the awning having a plurality of U-shaped rib members which are pivotally connected and movable from a deployed operable position to a substantially nested stored position;

providing a gathering flap for surrounding the awning when placing the awning in its nested stored position, the gathering flap having an indicia area that is rearwardly facing when the gathering flap surrounds the awning in its nested position;

providing a desired indicia in the gathering flap indicia area, the gathering flap being detachably engaged to the awning;

pivoting the plurality of U-shaped members to the substantially nested stored position; and surrounding the plurality of nested U-shaped members with the gathering flap thereby displaying the desired indicia in a manner where it is visible from the rear of the cart.

22. The method of claim 21 wherein the gathering flap is provided with a sleeve in the indicia area, the sleeve having a substantially transparent window therein, the method further comprising inserting a sign in the sleeve in a manner where the sign is viewable through the substantially transparent window from a location behind the golf cart.

23. The method of claim 22 wherein the sign includes one of a plurality of signs each having a different indicia, the method further comprising removing the sign from the sleeve and selectively replacing it with another from the plurality of signs.

24. The method of claim 21 wherein the gathering flap includes one of a plurality of gathering flaps each having a different indicia, the method further comprising detachably engaging the gathering flap from the awning and selectively replacing it with another from the plurality of gathering flaps.

25. The method of claim 21 wherein the gathering flap further comprises an indicia panel, said indicia panel being detachably from the gathering flap, and further comprising attaching an indicia panel to the gathering flap.

* * * * *